United States Patent
Yoshida (10) Patent No.: US 7,773,687 B2
(45) Date of Patent: Aug. 10, 2010

(54) WIRELESS APPARATUS, WIRELESS COMMUNICATION SYSTEM, AND TRANSMISSION MODE SELECTING METHOD

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 737 days.

(21) Appl. No.: 10/588,386

(22) PCT Filed: Feb. 2, 2005

(86) PCT No.: PCT/JP2005/001860

§ 371 (c)(1),
(2), (4) Date: Feb. 26, 2007

(87) PCT Pub. No.: WO2005/076512

PCT Pub. Date: Aug. 18, 2005

(65) Prior Publication Data

US 2007/0160122 A1     Jul. 12, 2007

(30) Foreign Application Priority Data

Feb. 4, 2004     (JP) ............................ 2004-027428

(51) Int. Cl.
    *H04B 15/00* (2006.01)
(52) U.S. Cl. ................................... 375/285
(58) Field of Classification Search ............. 375/261, 375/285, 298

See application file for complete search history.

(56) References Cited

U.S. PATENT DOCUMENTS 7,257,408 B2 * 8/2007 Kikuchi et al. ........... 455/452.2

2003/0156659 A1 * 8/2003 Hanaoka et al. ............ 375/298

FOREIGN PATENT DOCUMENTS

| JP | H08-181653 A | 7/1996 |
| JP | 9-298526 | 11/1997 |
| JP | 11-215545 | 8/1999 |
| JP | 2002-016545 A | 1/2002 |
| JP | 2002-044168 A | 2/2002 |
| JP | 2003-37554 | 2/2003 |

OTHER PUBLICATIONS

Japanese Official Action dated Jun. 16, 2010 together with an English language translation.

* cited by examiner

*Primary Examiner*—David C Payne
*Assistant Examiner*—Leon-Viet Q Nguyen
(74) *Attorney, Agent, or Firm*—Scully, Scott, Murphy & Presser, P.C.

(57) ABSTRACT

A wireless apparatus 1 receives reception quality information, propagation environment information, and block error rate detection information from a wireless apparatus of the other end of communication together with a data signal, and the target error rate selecting unit 7 selects any one of a plurality of tables in which target block error rates of respective ones of a plurality of transmission modes are registered in accordance with propagation environment information. The threshold value control unit 8 controls the threshold value of the reception quality to select the transmission mode by the control amount on the basis of the target block error rate in accordance with error rate detection information. The transmission mode selecting unit 9 compares reception quality information with the threshold value, selects any one of the transmission modes, and makes the selected one into the transmission mode to the wireless apparatus of the other end of communication.

26 Claims, 7 Drawing Sheets

WIRELESS APPARATUS, WIRELESS COMMUNICATION SYSTEM, AND TRANSMISSION MODE SELECTING METHOD

TECHNICAL FIELD

The present invention relates to a wireless apparatus, a wireless communication system, and a transmission mode selecting method, and particularly, the present invention relates to the improvement of a wireless communication formula which switches a transmission mode in accordance with a reception mode and a propagation environment.

BACKGROUND ART

A wireless communication system has a method for switching a transmission mode in accordance with a reception quality as a method for realizing the data transmission with a high speed and a high quality. The transmission mode to be switched is different depending on the reception quality, however, as a parameter for differentiating the content of the transmission mode, there are provided an encoding rate of a modulating system and an error correction code. For example, at a transmission side, an encoding rate k/n of an error correction code that a redundant bit of (n-k) bits is added to information bit of k bits is selected in accordance with the reception quality and further, a modification system such as QPSK, 16QAM, and 64QAM or the like capable of transmitting two bits, four bits, and six bits for one modulation, respectively is selected in accordance with the reception quality.

The more the encoding rate and the number of the modulation bits capable of being transmitted are, the higher the highest data transmission rate is, however, the reception quality (for example, SNR: a rate between a signal power and a noise power) to satisfy a target communication quality (indicated by a block error rate, a bit error rate, and a throughput or the like) becomes also higher. In the wireless communication system, the reception quality is varied depending on a propagation path among wireless apparatuses and interference from other wireless apparatuses or the like. Therefore, if the data is transmitted in the optimum mode that the data transmission rate becomes the highest in the transmission modes due to the modulating system and the encoding rate (hereinafter, abbreviated as a modulating/encoding mode) that can satisfy the target communication quality in accordance with the reception quality, it is possible to maximize the throughput of the system.

Figure 1:
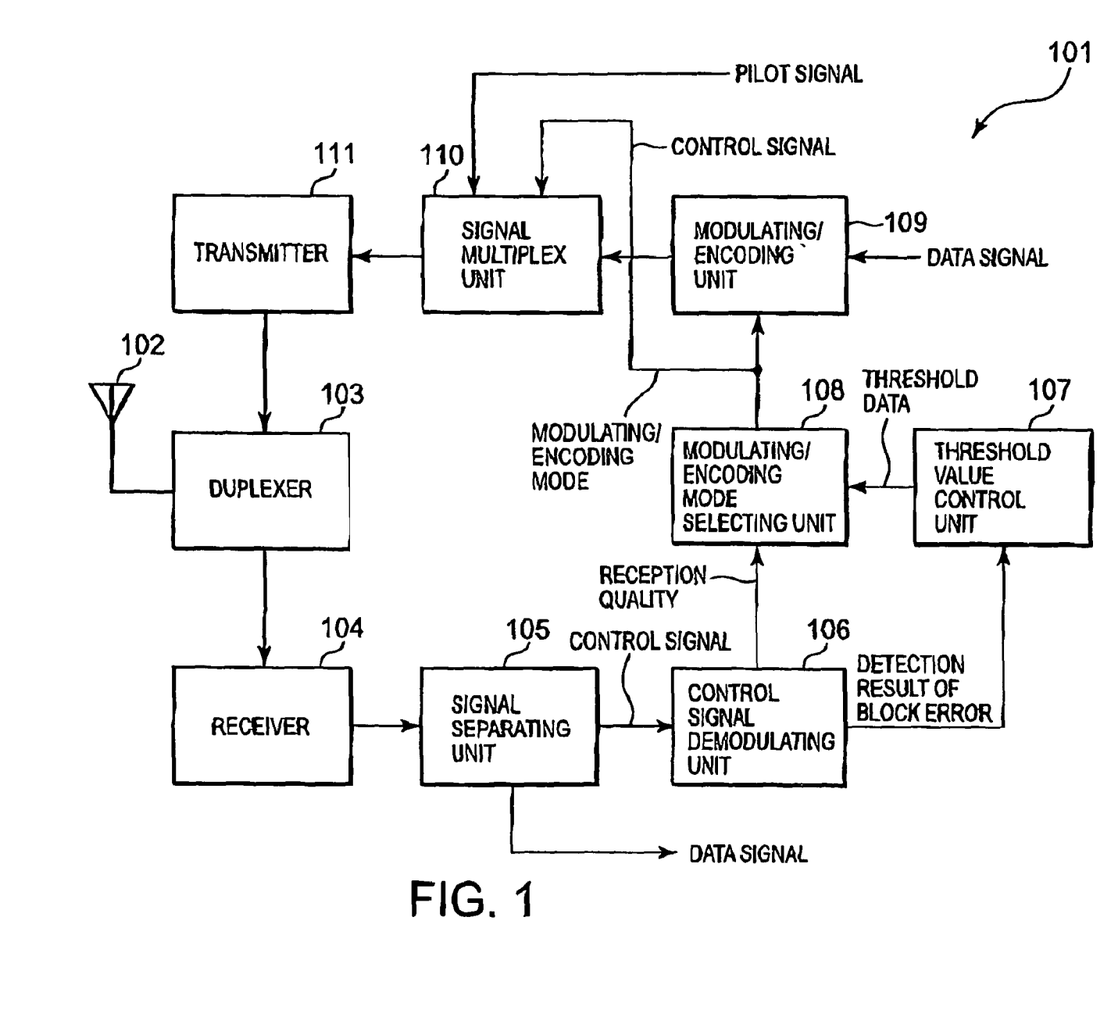
FIG. 1 is a view showing the structure of the wireless apparatus 101 in a conventional wireless communication system.
Figure 2:
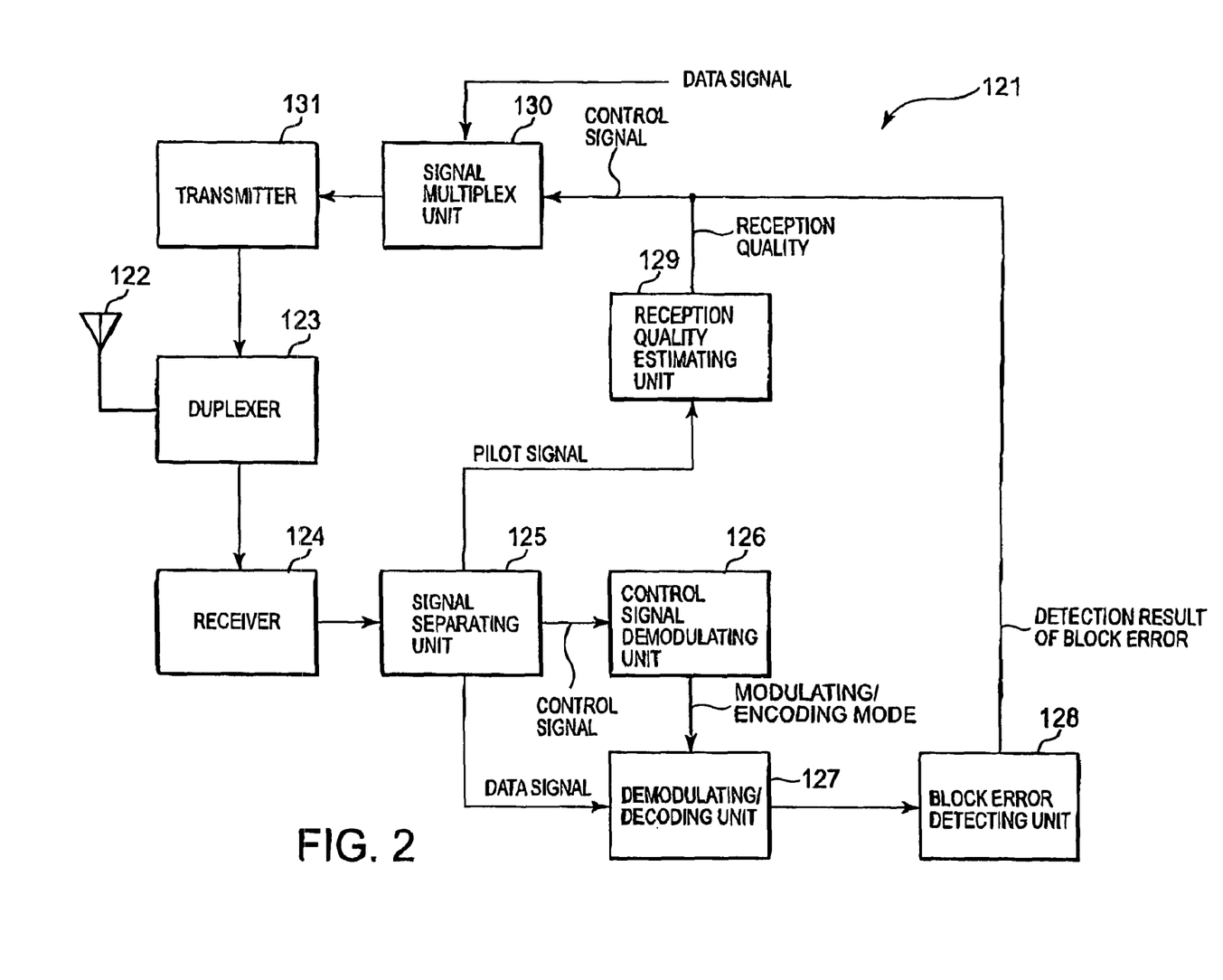
FIG. 2 is a view showing the structure of the wireless apparatus 121 in a conventional wireless communication system.

The structure of a conventional wireless apparatus for switching the above-described modulating/encoding mode is shown in FIG. 1 and FIG. 2. In a wireless apparatus 101 shown in FIG. 1, a signal separating unit 105 separates a control signal from a reception signal which is transmitted from an antenna 102 via a duplexer 103 and a receiver 104. A control signal demodulating unit 106 demodulates control signal and extracts reception quality information. A modulating/encoding mode selecting unit 108 compares the reception quality with a switching threshold of the modulating/encoding mode to select the modulating/encoding mode in accordance with the reception quality.

A modulating/encoding unit 109 carries out the error correction encoding and the modulation for a data signal in accordance with the selected modulating/encoding mode. A signal multiplex unit 110 multiplexes a data signal which is the output of the modulating/encoding unit 109 together with a control signal having modulating/encoding mode information and a pilot signal. Then, the output of the signal multiplex unit 110 will be transmitted from the antenna 102 to a wireless apparatus 121 shown in FIG. 2 via a transmitter 111 and a duplexer 103.

In the wireless apparatus 121 shown in FIG. 2, a signal separating unit 125 separates the pilot signal from a reception signal which is transmitted from an antenna 122 via a duplexer 123 and a receiver 124. A reception quality estimating unit 129 estimates SNR of the reception signal from the pilot signal. A signal multiplex unit 130 multiplexes the control signal having receipt quality information on a data signal. Then, the output of the signal multiplex unit 130 will be transmitted from the antenna 122 to the wireless apparatus 101 of FIG. 1 via a transmitter 131 and a duplexer 123.

Figure 6A:
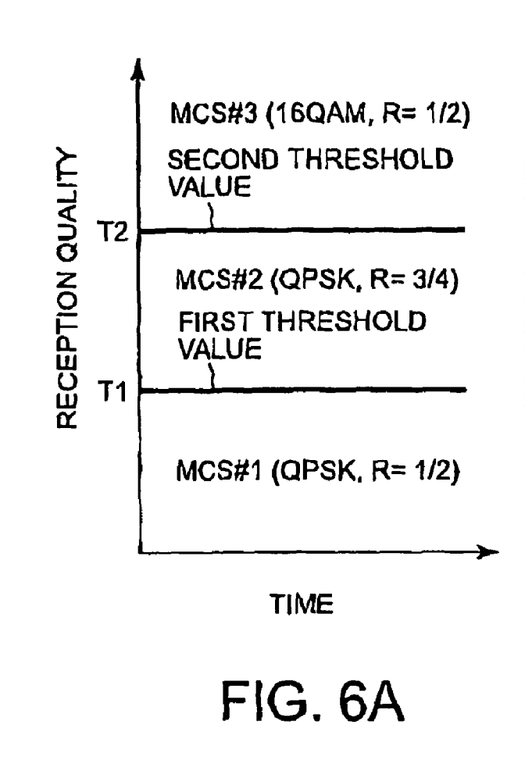
FIGS. 6A to 6C are views explaining the operation of the threshold value control unit 8 shown in FIG. 3.

As shown in FIG. 6A, a switching threshold value of the modulating/encoding mode is set at a fixed value in advance so as to indicate a range of the reception quality satisfying the target communication quality. According to an example of FIG. 6A, three modulating/encoding modes (hereinafter, abbreviated as MCS, here, it is defined that MCS#1 is QPSK, R=½, MCS#2=QPSK, R=¾, MCS#3=16 QAM, and R=½, respectively) are switched by a first threshold value T1 and a second threshold T2. In other words, when the reception quality <T1, MCS#1 is selected, when T1≦the reception quality <T2, MCS#2 is selected, and when the reception quality≧T2, MCS#3 is selected. As a result, it can be said that the better the reception quality is, the more the higher-speed data transmission can be carried out.

However, even if the reception quality is the same, when the propagation environment is different, the optimum modulating/encoding mode becomes different. A determining factor of this propagation includes a multipath environment (the number of path and delay dispersion) and the highest Doppler frequency (mobile speed) or the like, The fact that the optimum modulating/encoding mode is different even when the reception quality is the same leads to that the threshold value of the reception quality for selecting the optimum modulating/encoding mode is changed when the propagation environment is changed. The more the propagation environment is changed, the more the threshold value for selecting the modulating/encoding mode is changed. Therefore, in the case of the method of selecting the modulating/encoding mode comparing the reception quality with the fixed threshold value, it is difficult to have the optimum threshold value.

With reference to a JP-A-2003-37554 as a method for solving the above-described problem, there is provided a method for variably controlling the threshold value on the basis of with or without of the reception error in units of information blocks. According to the above-described wireless apparatus 121, a demodulating/decoding unit 127 demodulates a data signal in accordance with the modulating/encoding mode laid on the control signal. A block error detecting unit 128 detects with or without of the block error from a demodulation result of the data signal. This detection result of the block error will be transmitted to the wireless apparatus 101 being laid on the control signal.

According to the wireless apparatus 101, the signal separating unit 105 separates the control signal from the reception signal. The control signal demodulating unit 106 demodulates the control signal and extracts a detection result of a block error. The threshold value control unit 107 variably controls the threshold value of the reception quality on the basis of the block error which is noticed from this reception side.

Figure 6B:
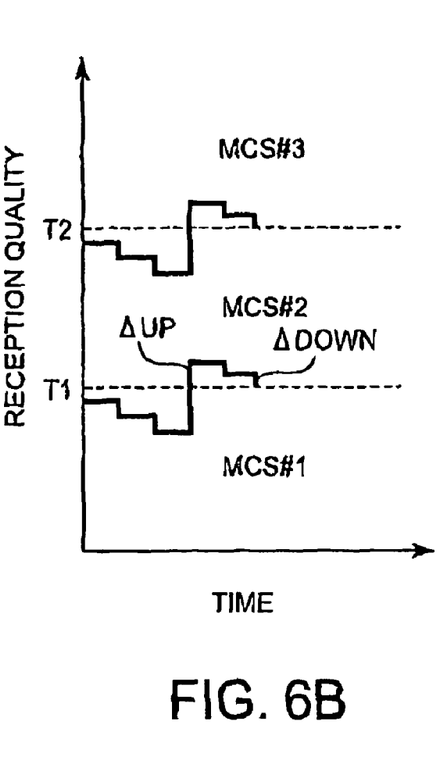
Figure 6C:
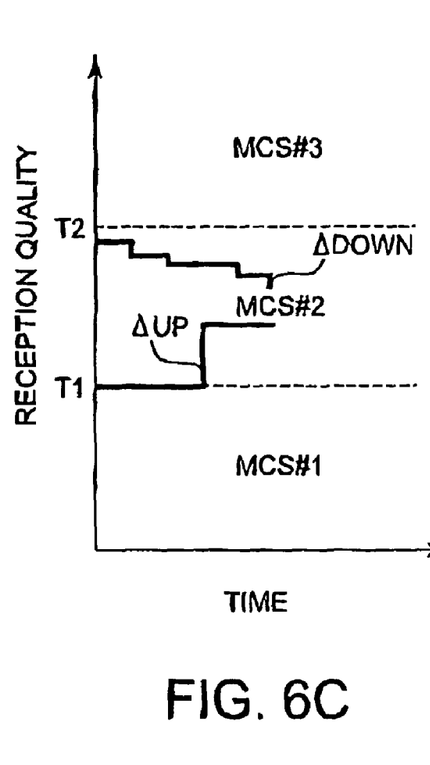

As the threshold value control unit 107, for example, there are provided methods shown in FIG. 6B and FIG. 6C. These drawings show the control methods in the case that the modulating/encoding mode of MC#2 has been used right now, respectively. According to the method of FIG. 6B, when the reception of the information block succeeds, the threshold value T1 and the threshold value T2 are decreased by a predetermined control amount Δ down dB, and when the reception of the information block fails, the threshold value T1 and the threshold value T2 are increased by the predetermined control amount Δ up dB. In the method shown in FIG. 6C, when the reception of the information block succeeds, only the threshold value T2 is decreased by the predetermined control amount Δ down dB, and when the reception of the information block fails, only the threshold value T1 is increased by the predetermined control amount Δ up dB.

In this case, assuming that a target block error rate is 1/N, Δ down and Δ up are set in the relation of Δ up=(N−1)×Δ down. Under this control, when the average block error rate of each modulating/encoding mode coincides with the target block error rate, the volumes of Δ down and Δ up balance and the threshold values stop (converge) here. Thereby, even if the propagation environment is changed, the threshold value to select the modulating/encoding mode can be adaptively set so as to keep the regular communication property.

Figure 7:
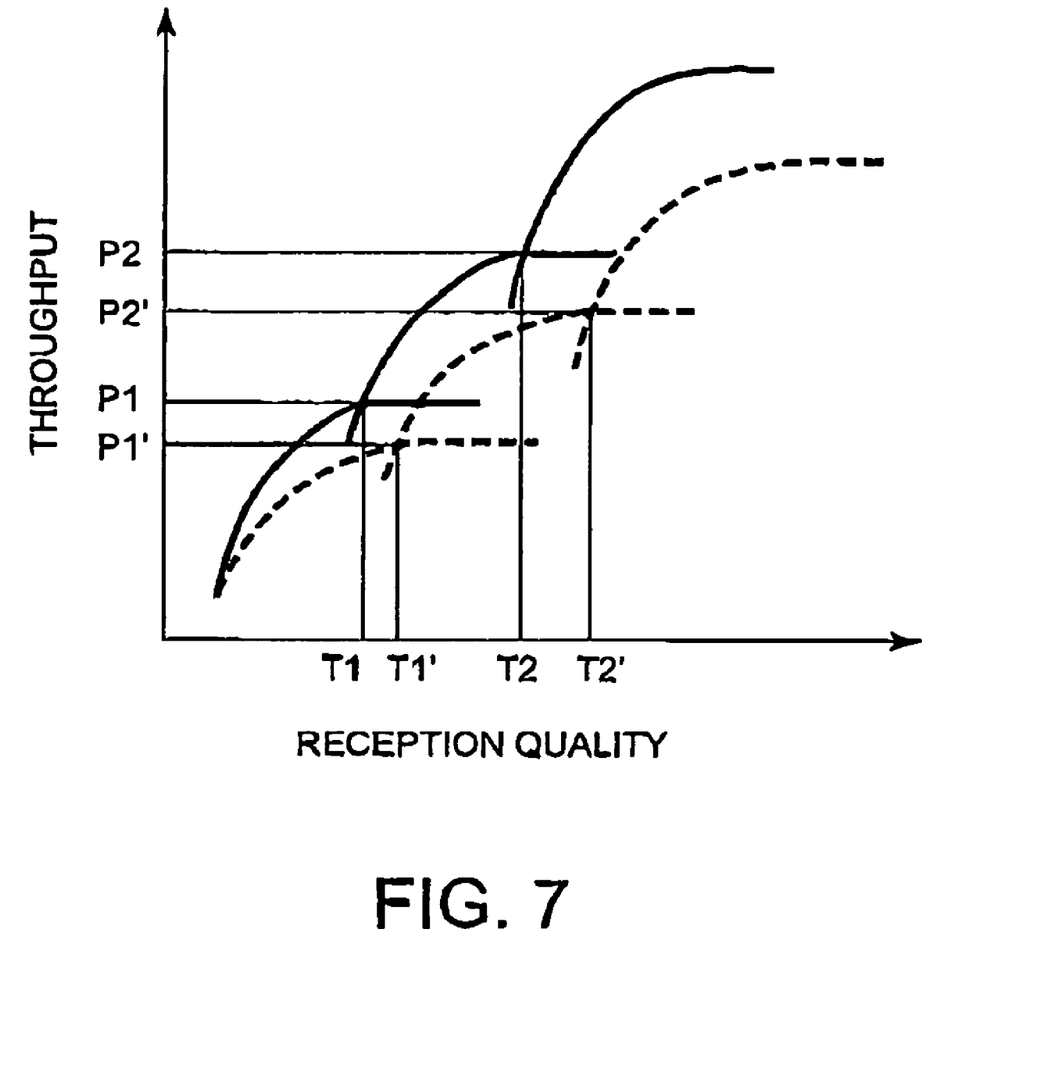
FIG. 7 is a view showing a throughput property with respect to a reception quality.

According to the above-described conventional art, it is possible to optimize the threshold value of the reception quality to select the modulating/encoding mode in accordance with change of the propagation environment to some extent; however, it seems that the deviation from the optimum value is generated when the change of the propagation environment is large. FIG. 7 shows a throughput property with respect to the reception quality in a propagation environment. In FIG. 7, a solid line shows the throughput property in the good propagation environment and a broken line shows the throughput property in the bad propagation environment, respectively.

Comparing the both, the threshold values T1 and T2 to select the modulating/encoding mode are changed into T1' and T2', and the volumes of the throughput, namely, $P_1$ and $P_2$ are changed into $P_1'$ and $P_2'$, respectively. The throughput of each modulating/encoding mode is represented by the maximum data transmission rate×(1−a block error rate) which can be sent by its modulating/encoding mode, so that lowering of throughput means that the average block error rate of each modulating/encoding mode is increased. Accordingly, in order to control the switching threshold value of the modulating/encoding mode optimally, it is necessary to change the target block error rate in accordance with the propagation environment.

An object of the present invention is to provide a wireless apparatus, a wireless communication system, and a transmission mode selecting method, whereby a transmission mode in accordance with a reception quality and a propagation environment can be optimally selected.

DISCLOSURE OF THE INVENTION

According to one aspect of the present invention, a wireless apparatus for wirelessly communicating with an opposite wireless apparatus is provided. The wireless apparatus includes: a receiver for receiving propagation environment information, block error rate detection information and reception quality information from the opposite wireless apparatus; a table selector for selecting one of plurality of tables in accordance with the received propagation environment information, In each one of the tables target error rates being correspondent to transmission modes; a threshold controller for controlling threshold values of reception quality in accordance with the received block error rate detection information and the selected table; a mode selector for selecting, with reference to comparison of the received reception quality information with the controlled threshold values, one of the transmission modes in order to transmit data to the opposite wireless apparatus with the selected transmission mode.

The threshold controller may increase the threshold values by Δ up or decrease the threshold value by Δ down, where the target error rate is 1/N, Δ up =(N−1)×Δ down.

The propagation environment information may include the number of path(s) in multipath environment.

Each of the tables may correspond to one of the numbers of the paths $P_1, P_2, \ldots, P_R$, where $R, P_1, P_2, \ldots, P_R$ are natural numbers and $P_1 < P_2 < \ldots < P_R$.

The propagation environment information may include a maximum Doppler frequency. For example, each of the tables may correspond to one of maximum Doppler frequencies $f_0, f_1, \ldots, f_{R-1}$, where $f_0 < f_1 < \ldots < f_{R-1}$. In this case, it is preferable that: if $x_{j-1} < f_d \leq x_j$, then the table selector selects the table corresponding to $f_j$; if $f_d \leq x_0$, then the table selector selects the table corresponding to $f_0$; and if $f_d > x_{R-2}$, then the table selector selects the table corresponding to $f_{R-1}$, where: $f_d$ is the maximum Doppler frequency in the received propagation environment information; i, j are integers; $0 \leq i \leq R-2$; $1 \leq j \leq R-2$; and $f_i < x_i < f_{i+1}$.

The propagation environment information may include delay dispersion. For example, each of the tables corresponds to one of the delay dispersions $\sigma_0, \sigma_1, \ldots, \sigma_{R-1}$, where $\sigma_0 < \sigma_1 < \ldots < \sigma_{R-1}$. In this case, it is preferable that: if $x_{j-1} < \sigma \leq x_j$, then the table selector selects the table corresponding to $\sigma_j$; if $\sigma \leq x_0$, then the table selector selects the table corresponding to $\sigma_0$; and if $\sigma > x_{R-2}$, then the table selector selects the table corresponding to $\sigma_{R-1}$, where: σ is the delay dispersion in the received propagation environment information; i, j are integers; $0 \leq i \leq R-2$; $1 \leq j \leq R-2$; and $\sigma_i < x_i < \sigma_{i+1}$.

Each of the tables may correspond to a combination of the number of path in multipath environment and a maximum Doppler frequency. In this case, it is preferable that J, K and R satisfy J×K=R, where: the corresponded number of path is one of $P_1, P_2, \ldots, P_J$; $P_1, P_2, \ldots, P_J$, are natural numbers; $P_1 < P_2 < \ldots < P_J < R$; the corresponded maximum Doppler frequency is one of $f_0, f_1, \ldots, f_{K-1}$; K is a natural number; and $K \leq R$.

Each of the tables may correspond to a combination of the number of path in multipath environment and a delay dispersion. In this case, it is preferable that J, K and R satisfy J×K=R, where: the corresponded number of path is one of $P_1, P_2, \ldots, P_J$; $P_1, P_2, \ldots, P_J$, are natural numbers: $P_1 < P_2 < \ldots < P_J < R$; the corresponded delay dispersion is one of $f_0, f_1, \ldots, f_{K-1}$; K is a natural number; and $K \leq R$.

Each of the tables may correspond to a combination of a maximum Doppler frequency and a delay dispersion.

Each of the tables may correspond to a combination of the number of path in multipath environment, a maximum Doppler frequency and a delay dispersion.

The reception quality information may include at least one of: a rate between a signal power and a noise power; a rate between a signal power and an interference power; and a rate between a signal power and a noise interference power.

Parameters of the transmission mode may include at least one of: type of modulation; and an encoding rate of an error correction.

According to another aspect of the present invention, a wireless communication system including a first wireless apparatus and a second wireless apparatus is provided. The first wireless apparatus includes: a measurer for measuring reception quality of communication with the second wireless apparatus on the basis of signals received from the second wireless apparatus to output a result of the measurement as reception quality information; an estimator for estimating propagation environment between the first and second wireless apparatus on the basis of signals received from the second wireless apparatus to output a result of the estimation as propagation environment information; an detector for detecting block errors from signals received from the second wireless apparatus to output a result of the detection as an error detection result; and a transmitter for transmitting the reception quality information, the propagation environment information and the error detection result to the second wireless apparatus together with data signals. The second wireless apparatus includes: a table selector for selecting one of plurality of tables in accordance with the received propagation environment information, in each one of the tables target error rates being correspondent to transmission modes; a threshold controller for controlling threshold values of reception quality in accordance with the received block error rate detection information and the selected table; a mode selector for selecting, with reference to comparison of the received reception quality information with the controlled threshold values, one of the transmission modes in order to transmit data to the opposite wireless apparatus with the selected transmission mode.

According to another aspect of the present invention, a method of selecting a transmission mode of wireless communication with an opposite wireless apparatus is provided. The method includes the steps of: receiving propagation environment information, block error rate detection information and reception quality information from the opposite wireless apparatus; selecting one of plurality of tables in accordance with the received propagation environment information, in each one of the tables target error rates being correspondent to transmission modes; controlling threshold values of reception quality in accordance with the received block error rate detection information and the selected table; selecting, with reference to comparison of the received reception quality information with the controlled threshold values, one of the transmission modes in order to transmit data to the opposite wireless apparatus with the selected transmission mode.

According to another aspect of the present invention, a method of selecting a transmission mode of wireless communication between a first wireless apparatus and a second wireless apparatus is provided. The method includes the steps of: measuring, at the first wireless apparatus, reception quality of communication with the second wireless apparatus on the basis of signals received from the second wireless apparatus to output a result of the measurement as reception quality information; estimating, at the first wireless apparatus, propagation environment between the first and second wireless apparatus on the basis of signals received from the second wireless apparatus to output a result of the estimation as propagation environment information; detecting, at the first wireless apparatus, block errors from signals received from the second wireless apparatus to output a result of the detection as an error detection result; transmitting, from the first wireless apparatus to the second wireless apparatus, the reception quality information, the propagation environment information and the error detection result to the second wireless apparatus together with data signals; selecting, at the second wireless apparatus, one of plurality of tables in accordance with the received propagation environment information, in each one of the tables target error rates being correspondent to transmission modes; controlling, at the second wireless apparatus, threshold values of reception quality in accordance with the received block error rate detection information and the selected table; selecting, at the second wireless apparatus, with reference to comparison of the received reception quality information with the controlled threshold values, one of the transmission modes in order to transmit data to the first wireless apparatus with the selected transmission mode.

The operation of the present invention will be described. In a wireless communication system capable of selecting a plurality of transmission modes, selecting a table of the target block error rate in accordance with the propagation environment, the threshold value of the reception quality to select the transmission mode in the control volume on the basis of the target block error rate in accordance with the detection result of the error is controlled. Thereby, it is possible to carry out the optimum selection of the transmission mode in accordance with the reception quality and the propagation environment.

BEST MODE FOR CARRYINQ OUT THE INVENTION

Figure 3:
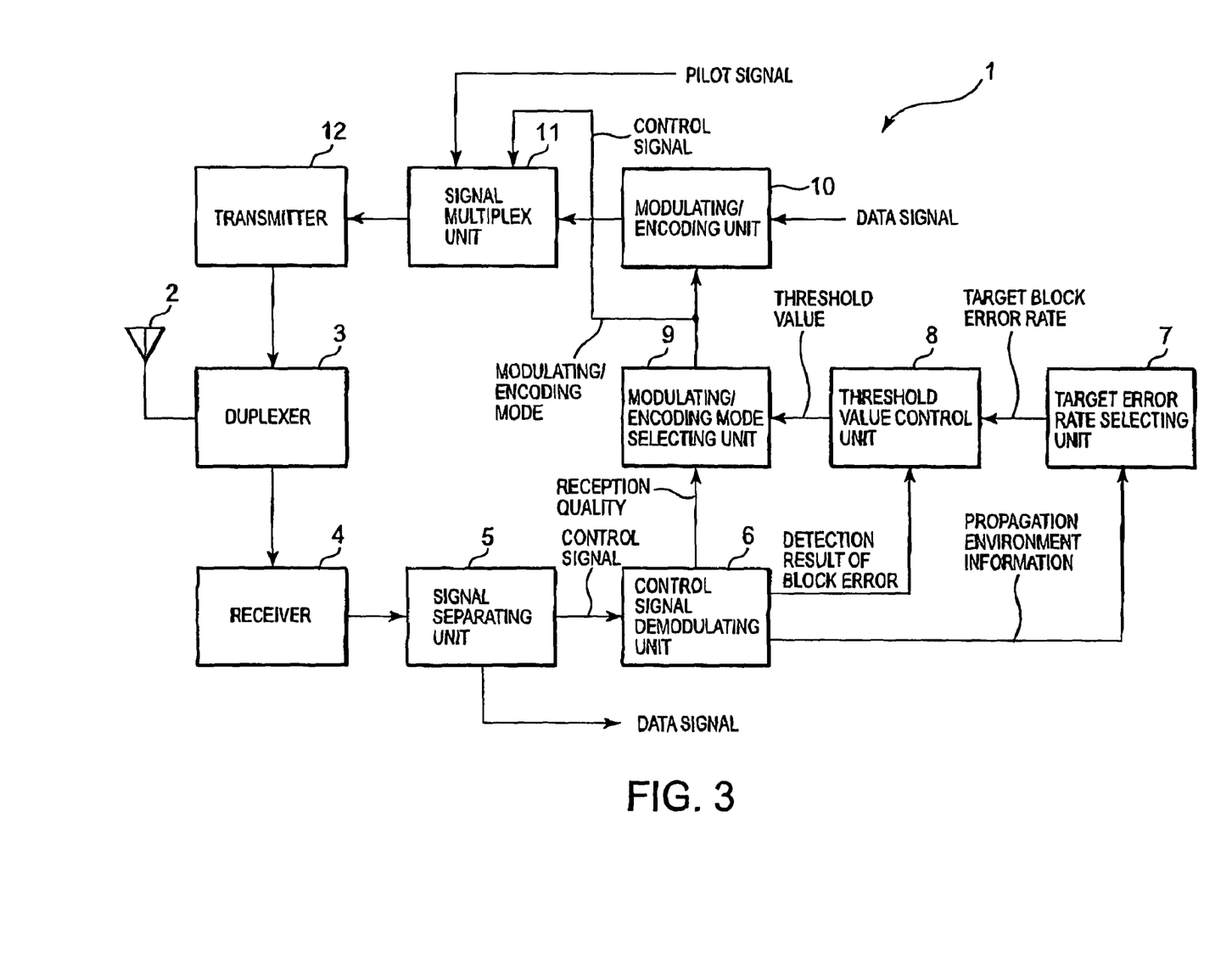
FIG. 3 is a view showing the structure of the wireless apparatus 1 according to an embodiment of the present invention.
Figure 4:
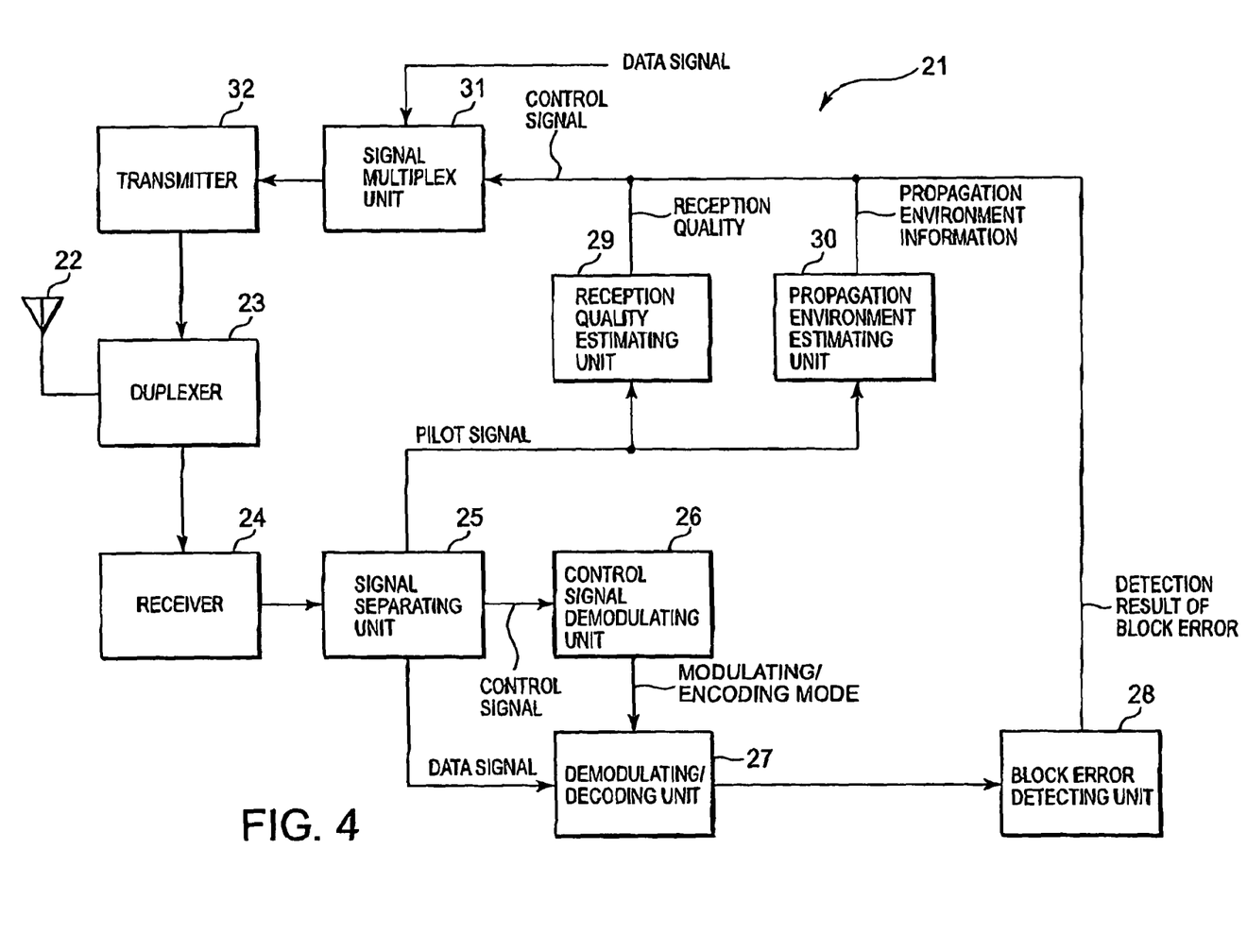
FIG. 4 is a view showing the structure of the wireless apparatus 21 according to an embodiment of the present invention.

With reference to the drawings, the embodiment of the present invention will be described below. FIG. 3 and FIG. 4 are block diagrams showing the structures of a wireless apparatus 1 and a wireless apparatus 21 according to the present embodiment of the present invention. The wireless apparatus 1 shown in FIG. 3 is configured by an antenna 2, an apparatus for the common use of transmission and reception (a duplexer) 3, a receiver 4, a signal separating unit 5, a control signal demodulating unit 6, a target error rate selecting unit 7, threshold value control unit 8, a modulating/encoding mode selecting unit (transmission mode selecting unit) 9, a modulating/encoding unit 10, a signal multiplexing unit 11, and a transmitter 12.

The receiver 4 transmits a signal from the wireless apparatus 21 which is received via the antenna 2 and the apparatus for the common use of transmission and reception 3 to the signal separating unit 5. The signal separating unit 5 separates a signal from the wireless apparatus 21 into the data signal and the control signal to transmit the control signal to the control signal demodulating unit 6. The control signal demodulating unit 6 demodulates the control signal, then, it extracts reception quality information, propagation environment information, and the block error detection result included in control information.

The target error rate selecting unit 7 outputs a corresponding target block error rate for each modulating/encoding mode having propagation environment information as the input. Obtaining a throughput property under various propagation environments in advance, the average block error rate is calculated for each modulating/encoding mode and its value is defined as a target block error rate.

Figure 5:
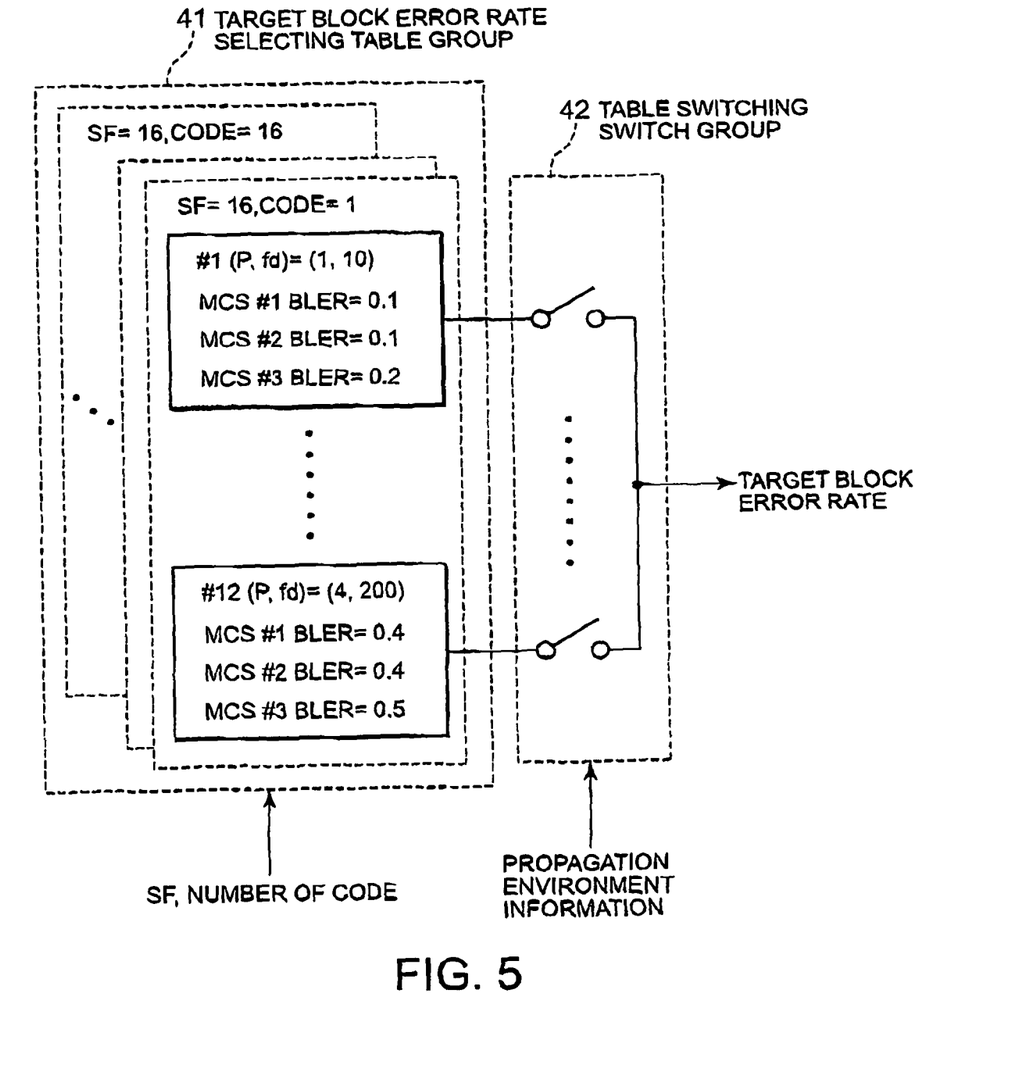
FIG. 5 is a view showing the structure of the target error rate selecting unit 7 shown in FIG. 3.

FIG. 5 shows the structure of the target error rate selecting unit 7 and the target error rate selecting unit 7 is configured by a target block error rate selecting table group 41 and a table switching switch group 42. In the target block error rate selecting table group 41, the target block error rate for each modulating/encoding mode in accordance with propagation environment information is stored. FIG. 5 shows an example of the table when using the number of path P and the maximum Doppler frequency fd.

Corresponding twelve target block error rate selecting tables ((P, fd)=(1, 10), (1, 100), ..., (4, 100), (4, 200)=#1 to #12) with the number of path=1, 2, 3 and the maximum Doppler frequency fd=10, 100, 200 Hz (the threshold value is defined to be 50 Hz and 150 Hz) are registered.

The arbitrary number of these table groups is prepared in accordance with the number of path P and the kind of the maximum Doppler frequency fd. As propagation environment information, the delay dispersion of the multipath or the like is considered other than the number of path and the maximum Doppler frequency fd, and the arbitrary combination of these information can be used as propagation environment information. In addition, in the case that the data signal is a coding multiplex (CDMA) signal, in addition to propagation environment information, the dispersion rate (SF) and the number of code affect the property, so that it is necessary to obtain the property in advance with various dispersion rates and numbers of codes and to prepare the table group with respect to the combination of SF and the number of code. FIG. 5 shows an example that the table groups corresponding to the code numbers 1 to 16 are prepared at SF=16.

The table switching switch group 42 selects one table from the target block error rate selecting table group 41 in accordance with propagation environment information. For example, in the case that the estimated number of path is 2, and the highest Doppler frequency is 80 Hz, the target block error rate selecting table #5 (=(2, 100)) corresponding to the maximum Doppler frequency 100 Hz is selected on the basis of the path number 2 and the threshold values 50 Hz and 150 Hz.

A threshold value control unit 8 variably controls the threshold value within the range of the reception quality on the basis of with or without of the block error which is noticed from this reception side. As shown in FIG. 6A and FIG. 6B, when the reception of the information block succeeds, the threshold value control unit 8 decreases the threshold value by the predetermined control amount Δ down dB; and when the reception of the information block fails, the threshold value control unit 8 increases the threshold value by the predetermined control amount Δ up dB.

In this case, assuming that a target block error rate for each modulating/encoding mode outputted by the target error rate selecting unit 7 is 1/N, Δ down and Δ up are set in the relation of Δ up=(N−1)×Δ down. Under this control, when the average block error rate of each modulating/encoding mode coincides with the target block error rate, the volumes of Δ down and Δ up balance and the threshold values converge. Thereby, even if the propagation environment is changed, the threshold value to select the modulating/encoding mode can be optimally set.

The modulating/encoding mode selecting unit 9 compares reception quality information included in control information with the threshold value of the reception quality to select each modulating/encoding mode to be outputted by the threshold value control unit 8; decides which modulating/encoding mode it should select; and outputs it as modulating/encoding mode information. The modulating/encoding unit 10 encodes a data signal to be inputted on the basis of modulating/encoding mode information and performs modulation. Then, adding a CRC (Cyclic Redundancy Check) code as a block error detection code to the encoded data signal, the modulating/encoding unit 10 transmits this data signal to the signal multiplexing unit 11.

The signal multiplexing unit 11 multiplexes the control signal having a data signal, a pilot signal, and modulating/encoding mode information laid thereon, and this control signal is transmitted to the wireless apparatus 2 from the antenna 2 via the transmitter 12 and the apparatus for the common use of transmission and reception 3.

The wireless apparatus 21 shown in FIG. 4 is configured by an antenna 22, an apparatus for the common use of transmission and reception (a duplexer) 23, a receiver 24, a signal separating unit 25, a control signal demodulating unit 26, a demodulating/decoding unit 27, a block error detecting unit 28, a reception quality measuring unit 29, a propagation environment estimating unit 30, a signal multiplexing unit 31, and a transmitter 32.

The receiver 24 transmits a signal from the wireless apparatus 1 which is received via the antenna 22 and the apparatus for the common use of transmission and reception 23 to the signal separating unit 25. The signal separating unit 25 separates the data signal, the control signal, and the pilot signal from the output signal from the wireless apparatus 1; and transmits the control signal to the control signal demodulating unit 26. In addition, the signal separating unit 25 transmits the pilot signal to the reception quality measuring unit 29 and the propagation environment estimating unit 30.

The control signal demodulating unit 26 demodulates the control signal and transmits modulating/encoding mode information for designating the modulating system and the error correction encoding rate to the demodulating/decoding unit 27 as control information. The demodulating/decoding unit 27 demodulates and decode the data signal which is sent from the signal separating unit 25 with the modulating system and the encoding rate which are designated by modulating/encoding mode information and then, it transmits the decoding data to the block error detecting unit 28. The block error detecting unit 28 determines with or without of the reception error of the information data block using a CRC code added to the data signal which is decoded by the demodulating/decoding unit 27, and then, it transmits the detection result of the block error to the signal multiplexing unit 31 being laid on the control signal.

The reception quality measuring unit 29 measures a signal power vs noise power rate (SNR) by the inputted pilot signal and transmits it to the signal multiplexing unit 31 being laid on the control signal as reception quality information. As reception quality information, a signal power vs interference power rate (SIR) and a signal power vs noise interference power (SINR) or the like are used in addition to SNR. The propagation environment estimating unit 30 estimates the propagation environment from the inputted pilot signal and transmits this to the signal multiplexing unit 31 as propagation environment information being laid on the control signal. As propagation environment information, the number of path of the multipath, the delay dispersion, and the maximum Doppler frequency (the mobile speed) or the like are conceivable.

In the signal multiplexing unit 31, the control signal having the data signal for transmission, the detection result of the block error, reception quality information, and propagation environment information laid thereon are multiplexed, and then, this control signal is transmitted from the antenna 22 to the wireless apparatus 1 via the transmitter 32 and the common use of transmission and reception 23.

According to the above operations, the optimum selection of the modulating/encoding mode in accordance with propagation environment information can be easily carried out, so that the throughput of the wireless communication system capable of selecting a plurality of transmission modes can be maximized.

In the case of using the number of path as propagation environment information, it is assumed that the plurality of tables corresponds to the number of paths $P_1, P_2, \ldots, P_R$ ($P_1, P_2, \ldots,$ and $P_R$ are natural numbers and they satisfy $P_1 < P_2 < \ldots < P_R$).

In addition, in the case of using the maximum Doppler frequency as propagation environment information, it is assumed that the plurality of tables corresponds to the maximum Doppler frequencies $f_0, f_1, \ldots, f_{R-1}$ ($f_0 < f_1 < \ldots < f_{R-1}$); when the maximum Doppler frequency fd satisfies $x_{j-1} < fd \leq x_j$ (j is an integer number not less than 1 and not more than R-2) with respect to a threshold value $x_i$ ($x_i$ is an arbitrary number satisfying $f_i < x_i < f_{i+1}$, i is an integer number not less than 0 and not more than R-1), $f_j$ is selected as the maximum Doppler frequency; when the maximum Doppler frequency fd satisfies $fd \leq x_0$, $f_0$ is selected as the maximum Doppler frequency; and when the maximum Doppler frequency fd satisfies $fd > x_{R-2}$, $f_{R-1}$ is selected as the maximum Doppler frequency, respectively.

In addition, in the case of using a delay dispersion as propagation environment information, it is assumed that the plurality of tables corresponds to delay dispersions $\sigma_0, \sigma_1, \ldots, \sigma_{R-1}$ ($\sigma_0 < \sigma_1 < \ldots < \sigma_{R-1}$); when a delay dispersion $\sigma$ satisfies $x_{j-1} < \sigma \leq x_j$ (j is an integer number not less than 1 and not more than R-2) with respect to the threshold value $x_i$ ($x_i$ is an arbitrary number satisfying $\sigma_1 < x_1 < \sigma_1 + 1$, i is an integer number not less than 0 and not more than R-2), $\sigma_j$ is selected as the delay dispersion; when the delay dispersion $\sigma$ satisfies $\sigma \leq x_0$, $\sigma_0$ is selected as the delay dispersion; and when the delay dispersion $\sigma$ satisfies $\sigma > x_{R-2}$, $\sigma_{R-1}$ is selected as the delay dispersion, respectively.

Further, the plurality of selection tables corresponds to the combinations of the numbers of paths $P_1, P_2, \ldots, P_J$ ($P_1, P_2, \ldots, P_J$ are natural numbers not more than R and they satisfy $P_1 < P_2 < \ldots < P_J$) and the maximum Doppler frequencies $f_0, f_1, \ldots, f_{K-1}$ (K is a natural number not more than R and satisfies J×K=R).

In addition, the plurality of selection tables corresponds to the combinations of the numbers of paths $P_1, P_2, \ldots, P_J$ ($P_1, P_2, \ldots, P_J$ are natural numbers and they satisfy $P_1 < P_2 < \ldots < P_J$) and the delay dispersions $\sigma_0, \sigma_P, \ldots, \sigma_{L-1}$ (L is a natural number not more than R and satisfies J×L=R) (however, when the number of path is 1, the delay dispersion is not used as propagation environment information).

Further, the plurality of tables corresponds to the combination of the maximum Doppler frequencies $f_0$ to $f_{K-1}$ and the delay dispersions $\sigma_0$ to $\sigma_{L-1}$ (L is a natural number not more than R and satisfies K×L=R). In addition, the plurality of tables corresponds to the combination of the numbers of paths $P_1, P_2, \ldots, P_J$; the maximum Doppler frequencies $f_0$ to $f_{K-1}$; and the delay dispersions $\sigma_0$ to $\sigma_{L-1}$ (J, K, L, and R are natural numbers satisfying J×K×L=R) (however, when the number of path is 1, the delay dispersion is not used as propagation environment information).

INDUSTRIAL APPLICABILITY

According to the present invention, by selecting a table of a target block error rate in accordance with a propagation environment of the communication and controlling a threshold value of a reception quality to select a transmission mode with a control amount on the basis of the target block error rate in accordance with a result of error detection, there is an advantage capable of carrying out the optimum selection of the transmission mode in accordance with the reception quality and the propagation environment.

The invention claimed is:

1. A wireless apparatus for wirelessly communicating with an opposite wireless apparatus, comprising:
    a receiver for receiving propagation environment information, block error rate detection information and reception quality information from the opposite wireless apparatus;
    a table selector for selecting one of a plurality of tables in accordance with the received propagation environment information, each of the tables having target error rates corresponding to transmission modes;
    a threshold controller for controlling threshold values of reception quality in accordance with the received block error rate detection information and the selected table;
    a mode selector for selecting, with reference to comparison of the received reception quality information with the controlled threshold values, one of the transmission modes in order to transmit data to the opposite wireless apparatus with the selected transmission mode, wherein the propagation environment information comprises a maximum Doppler frequency, and wherein:
    each of the tables corresponds to one of maximum Doppler frequencies $f_0, f_1, \ldots, f_{R-1}$, where $f_0 < f_1 < \ldots < f_{R-1}$;
    if $x_{j-1} < f_d \leq x_j$, then the table selector selects the table corresponding to $f_j$;
    if $f_d \leq x_0$, then the table selector selects the table corresponding to $f_0$; and
    if $f_d > x_{R-2}$, then. the table selector selects the table corresponding to $f_{R-1}$,
    where:
    $f_d$ is the maximum Doppler frequency in the received propagation environment Information;
    i, j are integers;
    $0 \leq i \leq R-2$;
    $1 \leq j \leq R-2$; and
    $f_i < x_i < f_{i+1}$.

2. The wireless apparatus claimed in claim 1, wherein the threshold controller increases the threshold values by Δ up or decreases the threshold value by Δ down, where the target error rate is 1/N, Δ up=(N−1)×Δ down.

3. The wireless apparatus claimed in claim 1, wherein the propagation environment information comprises the number of path(s) in multipath environment.

4. The wireless apparatus claimed in claim 3, wherein each of the tables corresponds to one of the numbers of the paths $P_1, P_2, \ldots, P_R$, where R, $P_1, P_2, \ldots, P_R$ are natural numbers and $P_1 < P_2 < \ldots < P_R$.

5. A wireless apparatus for wirelessly communicating with an opposite wireless apparatus, comprising:

a receiver for receiving propagation environment information, block error rate detection information and reception quality information from the opposite wireless apparatus;
a table selector for selecting one of a plurality of tables in accordance with the received propagation environment information, each of the tables having target error rates corresponding to transmission modes;
a threshold controller for controlling threshold values of reception quality in accordance with the received block error rate detection information and the selected table;
a mode selector for selecting, with reference to comparison of the received reception quality information with the controlled threshold values, one of the transmission modes in order to transmit data to the opposite wireless apparatus with the selected transmission mode, wherein the propagation environment information comprises delay dispersion, and wherein:
each of the tables corresponds to one of the delay dispersions $\sigma_0, \sigma_1, \ldots, \sigma_{R-1}$, where $\sigma_0 < \sigma_1 < \ldots < \sigma_{R-1}$;
if $x_{j-1} < \sigma \leq x_j$, then the table selector selects the table corresponding to $\sigma_j$;
if $\sigma \leq x_0$, then the table selector selects the table corresponding to $\sigma_0$; and
if $\sigma > x_{R-2}$, then the table selector selects the table corresponding to $\sigma_{R-1}$,
where:
$\sigma$ is the delay dispersion in the received propagation environment information;
i, j are integers;
$0 \leq i \leq R-2$;
$1 \leq j \leq R-2$; and
$\sigma_i < x_i < \sigma_{i+1}$.

6. The wireless apparatus claimed in claim 1, wherein each of the tables corresponds to a combination of the number of path in multipath environment and a maximum Doppler frequency.

7. The wireless apparatus claimed in claim 1, wherein each of the tables corresponds to a combination of the number of path in multipath environment and a delay dispersion.

8. The wireless apparatus claimed in claim 1, wherein each of the tables corresponds to a combination of a maximum Doppler frequency and a delay dispersion.

9. The wireless apparatus claimed in claim 1, wherein each of the tables corresponds to a combination of the number of path in multipath environment, a maximum Doppler frequency and a delay dispersion.

10. The wireless apparatus claimed in claim 1, wherein the reception quality information comprises at least one of:
a rate between a signal power and a noise power;
a rate between a signal power and an interference power; and
a rate between a signal power and a noise interference power.

11. The wireless apparatus claimed in claim 1, parameters of the transmission mode comprises at least one of:
type of modulation; and
an encoding rate of an error correction.

12. A wireless communication system comprising a first wireless apparatus and a second wireless apparatus,
wherein the first wireless apparatus comprises:
a measurer for measuring reception quality of communication with the second wireless apparatus on the basis of signals received from the second wireless apparatus to output a result of the measurement as reception quality information;
an estimator for estimating propagation environment between the first and second wireless apparatus on the basis of signals received from the second wireless apparatus to output a result of the estimation as propagation environment information;
an detector for detecting block errors from signals received from the second wireless apparatus to output a result of the detection as an error detection result; and
a transmitter for transmitting the reception quality information, the propagation environment information and the error detection result to the second wireless apparatus together with data signals,
wherein the second wireless apparatus comprises:
a table selector for selecting one of plurality of tables in accordance with the received propagation environment information, in each one of the tables target error rates being correspondent to transmission modes;
a threshold controller for controlling threshold values of reception quality in accordance with the received block error rate detection information and the selected table;
a mode selector for selecting, with reference to comparison of the received reception quality information with the controlled threshold values, one of the transmission modes in order to transmit data to the opposite wireless apparatus with the selected transmission mode, wherein in the propagation environment information comprises a maximum Doppler frequency, and wherein:
each of the tables corresponds to one of maximum Doppler frequencies $f_0, f_1, \ldots, f_{R-1}$, where $f_0 < f_1 < \ldots < f_{R-1}$;
if $x_{j-1} < f_d < x_j$, then the table selector selects the table corresponding to $f_j$;
if $f_d \leq x_0$, then the table selector selects the table corresponding to $f_0$; and
if $f_d > x_{R-2}$, then the table selector selects the table corresponding to $f_{R-1}$,
where:
$f_d$ is the maximum Doppler frequency in the received propagation environment information;
i, j are integers;
$0 \leq i \leq R-2$;
$1 \leq j \leq R-2$; and
$f_i < x_i < f_{i+1}$.

13. The wireless communication system claimed in claim 12, wherein the threshold controller increases the threshold values by $\Delta$ up or decreases the threshold value by $\Delta$ down, where the target error rate is 1/N, $\Delta$ up=(N-1)×$\Delta$ down.

14. The wireless communication system claimed in claim 12, wherein the propagation environment information comprises the number of path(s) in multipath environment.

15. The wireless communication system claimed in claim 14, wherein each of the tables corresponds to one of the numbers of the paths $P_1, P_2, \ldots, P_R$, where R, $P_1, P_2, \ldots, P_R$ are natural numbers and $P_1 < P_2 < \ldots < P_R$.

16. A wireless communication system comprising a first wireless apparatus and a second wireless apparatus,
wherein the first wireless apparatus comprises:
a measurer for measuring reception quality of communication with the second wireless apparatus on the basis of signals received from the second wireless apparatus to output a result of the measurement as reception quality information;
an estimator for estimating propagation environment between the first and second wireless apparatus on the basis of signals received from the second wireless apparatus to output a result of the estimation as propagation environment information;

an detector for detecting block errors from signals received from the second wireless apparatus to output a result of the detection as an error detection result; and a transmitter for transmitting the reception quality information, the propagation environment information and the error detection result to the second wireless apparatus together with data signals, wherein the second wireless apparatus comprises:

a table selector for selecting one of plurality of tables in accordance with the received propagation environment information, in each one of the tables target error. rates being correspondent to transmission modes;

a threshold controller for controlling threshold. values of reception quality in accordance with the received block error rate detection information and the selected table;

a mode selector for selecting, with reference to comparison of the received reception quality information with the controlled threshold values, one of the transmission modes in order to transmit data to the opposite wireless apparatus with the selected transmission mode, wherein the propagation environment information comprises delay dispersion, and wherein:

each of the tables corresponds to one of the delay dispersions $\sigma_0, \sigma_1 \ldots, \sigma_{R-1}$, where $\sigma_0 < \sigma_1 < \ldots < \sigma_{R-1}$;

if $x_{j-1} < \sigma \leq x_j$, then the table selector selects the table corresponding to $\sigma_j$;

if $\sigma \leq x_0$, then the table selector selects the table corresponding to $\sigma_0$; and if $\sigma > x_{R-2}$, then the table selector selects the table corresponding to $\sigma_{R-1}$, where:

$\sigma$ is the delay dispersion in the received propagation environment information;

i, j are integers;

$0 \leq i \leq R-2$;

$1 \leq j \leq R-2$; and $\sigma_i < x_i < \sigma_{i+1}$.

17. The wireless communication system claimed in claim 12, wherein each of the tables corresponds to a combination of the number of path in multipath environment and a maximum Doppler frequency.

18. The wireless communication system claimed in claim 12, wherein each of the tables corresponds to a combination of the number of path in multipath environment and a delay dispersion.

19. The wireless communication system claimed in claim 12, wherein each of the tables corresponds to a combination of a maximum Doppler frequency and a delay dispersion.

20. The wireless communication system claimed in claim 12, wherein each of the tables corresponds to a combination of the number of path in multipath environment, a maximum Doppler frequency and a delay dispersion.

21. The wireless communication system claimed in claim 12, wherein the reception quality information comprises at least one of:

a rate between a signal power and a noise power;

a rate between a signal power and an interference power; and a rate between a signal power and a noise interference power.

22. The wireless communication system claimed in claim 12, parameters of the transmission mode comprises at least one of:

type of modulation; and an encoding rate of an error correction.

23. A method of selecting a transmission mode of wireless communication with an opposite wireless apparatus, comprising the steps of:

receiving propagation environment information, block error rate detection information and reception quality information from the opposite wireless apparatus;

selecting one of a plurality of tables in accordance with the received propagation environment information, each of the tables having target error rates corresponding to transmission modes;

controlling threshold values of reception quality in accordance with the received block error rate detection information and the selected table;

selecting, with reference to comparison of the received reception quality information with the controlled threshold values, one of the transmission modes in order to transmit data to the opposite wireless apparatus with the selected transmission mode, wherein the propagation environment information comprises a maximum Doppler frequency, and wherein:

each of the tables corresponds to one of maximum Doppler frequencies $f_0, f_1, \ldots, f_{R-1}$, where $f_0 < f_1 < \ldots < f_{R-1}$;

if $x_{j-1} < f_d \leq x_j$, then the table selector selects the table corresponding to $f_j$;

if $f_d \leq x_0$, then the table selector selects the table corresponding to $f_0$; and if $f_d > x_{R-2}$, the table selector selects the table corresponding to $f_{R-1}$, where:

$f_d$ is the maximum Doppler frequency in the received propagation environment information:

i, j are integers;

$0 \leq i \leq R-2$;

$1 \leq j \leq R-2$; and $f_i < x_i < f_{i+1}$.

24. A method of selecting a transmission mode of wireless communication between a first wireless apparatus and a second wireless apparatus, comprising the steps of:

measuring, at the first wireless apparatus, reception quality of communication with the second wireless apparatus on the basis of signals received from the second wireless apparatus to output a result of the measurement as reception quality information;

estimating, at the first wireless apparatus, propagation environment between the first and second wireless apparatus on the basis of signals received from the second wireless apparatus to output a result of the estimation as propagation environment information;

detecting, at the first wireless apparatus, block errors from signals received from the second wireless apparatus to output a result of the detection as an error detection result;

transmitting, from the first wireless apparatus to the second wireless apparatus, the reception quality information, the propagation environment information and the error detection result to the second wireless apparatus together with data signals;

selecting, at the second wireless apparatus, one of plurality of tables in accordance with the received propagation environment information, in each one of the tables target error rates being correspondent to transmission modes;

controlling, at the second wireless apparatus, threshold values of reception quality in accordance with the received block error rate detection information and the selected table;

selecting, at the second wireless apparatus, with reference to comparison of the received reception quality information with the controlled threshold values, one of the transmission modes in order to transmit data to the first wireless apparatus with the selected transmission mode, wherein the propagation environment information comprises a maximum Doppler frequency, and wherein:

each of the tables corresponds to one of maximum Doppler frequencies $f_0, f_1, \ldots, f_{R-1}$, where $f_0 < f_1 < \ldots < f_{R-1}$;

if $x_{j-1} < f_d \leq x_j$, then the table selector selects the table corresponding to $f_j$;

if $f_d \leq x_0$, then the table selector selects the table corresponding to $f_0$; and if $f_d > x_{R-2}$, then the table selector selects the table corresponding to $f_{R-1}$, where:

$f_d$ is the maximum Doppler frequency in the received propagation environment information;

i, j are integers;

$0 \leq i \leq R-2$;

$1 \leq j \leq R-2$; and $f_i < x_i < f_{i+1}$.

25. A method of selecting a transmission mode of wireless communication with an opposite wireless apparatus, comprising the steps of:

receiving propagation environment information, block error rate detection information and reception quality information from the opposite wireless apparatus;

selecting one of a plurality of tables in accordance with the received propagation environment information, each of the tables having target error rates corresponding to transmission modes;

controlling threshold values of reception quality in accordance with the received block error rate detection information and the selected table;

selecting, with reference to comparison of the received reception quality information with the controlled threshold values, one of the transmission modes in order to transmit data to the opposite wireless apparatus with the selected transmission mode, wherein the propagation environment information comprises delay dispersion, and wherein:

each of the tables corresponds to one of the delay dispersions $\sigma_0, \sigma_1, \ldots, \sigma_{R-1}$, where $\sigma_0 < \sigma_1 < \ldots < \sigma_{R-1}$;

if $x_{j-1} < \sigma \leq x_j$, then the table selector selects the table corresponding to $\sigma_j$;

if $\sigma \leq x_0$, then the table selector selects the table corresponding to $\sigma_0$; and if $\sigma > x_{R-2}$, then the table selector selects the table corresponding to $\sigma_{R-1}$, where:

$\sigma$ is the delay dispersion in the received propagation environment information;

i, j are integers;

$0 \leq i \leq R-2$;

$1 \leq j \leq R-2$; and $\sigma_i < x_i < \sigma_{i+1}$.

26. A method of selecting a transmission mode of wireless communication between a first wireless apparatus and a second wireless apparatus, comprising the steps of:

measuring, at the first wireless apparatus, reception quality of communication with the second wireless apparatus on the basis of signals received from the second wireless apparatus to output a result of the measurement as reception quality information;

estimating, at the first wireless apparatus, propagation environment between the first and second wireless apparatus on the basis of signals received from the second wireless apparatus to output a result of the estimation as propagation environment information;

detecting, at the first wireless apparatus, block errors from signals received from the second wireless apparatus to output a result of the detection as an error detection result;

transmitting, from the first wireless apparatus to the second wireless apparatus, the reception quality information, the propagation environment information and the error detection result to the second wireless apparatus together with data signals;

selecting, at the second wireless apparatus, one of plurality of tables in accordance with the received propagation environment information, in each one of the tables target error rates being correspondent to transmission modes;

controlling, at the second wireless apparatus, threshold values of reception quality in accordance with the received block error rate detection information and the selected table;

selecting, at the second wireless apparatus, with reference to comparison of the received reception quality information with the controlled threshold values, one of the transmission modes in order to transmit data to the first wireless apparatus with the selected transmission mode, wherein the propagation environment information comprises delay dispersion, and wherein:

each of the tables corresponds to one of the delay dispersions $\sigma_0, \sigma_1, \ldots, \sigma_{R-1}$, where $\sigma_0 < \sigma_1 < \ldots < \sigma_{R-1}$;

if $x_{j-1} < \sigma \leq x_j$, then the table selector selects the table corresponding to $\sigma_j$;

if $\sigma \leq x_0$, then the table selector selects the table corresponding to $\sigma_0$; and if $\sigma > x_{R-2}$, then the table selector selects the table corresponding to $\sigma_{R-1}$, where:

$\sigma$ is the delay dispersion in the received propagation environment information;

i, j are integers;

$0 \leq i \leq R-2$;

$1 \leq j \leq R-2$; and $\sigma_i < x_i < \sigma_{i+1}$.

* * * * *